US012225598B2

(12) United States Patent
Fujishiro (10) Patent No.: US 12,225,598 B2
(45) Date of Patent: Feb. 11, 2025

(54) MOBILE COMMUNICATION SYSTEM, RELAY NODE, AND BASE STATION

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/661,433

(22) Filed: Apr. 29, 2022

(65) Prior Publication Data

US 2022/0264665 A1 Aug. 18, 2022

Related U.S. Application Data

(63) Continuation of application No. 17/093,035, filed on Nov. 9, 2020, now Pat. No. 11,350,467, which is a
(Continued)

(30) Foreign Application Priority Data

May 9, 2018 (JP) .................................. 2018-090447

(51) Int. Cl.
*H04W 36/00* (2009.01)
*H04W 8/26* (2009.01)
*H04W 16/32* (2009.01)
*H04W 48/08* (2009.01)
*H04W 76/10* (2018.01)
(Continued)

(52) U.S. Cl.
CPC ............ *H04W 76/10* (2018.02); *H04W 8/26* (2013.01); *H04W 16/32* (2013.01); *H04W 36/0055* (2013.01); *H04W 48/08* (2013.01); *H04W 80/02* (2013.01); *H04W 92/04* (2013.01)

(58) Field of Classification Search
None
See application file for complete search history.

(56) References Cited

U.S. PATENT DOCUMENTS

2011/0242970 A1 10/2011 Prakash et al.
2014/0135007 A1* 5/2014 Yu ......................... H04W 24/02
455/436
(Continued)

FOREIGN PATENT DOCUMENTS

WO 2015/117028 A1 8/2015
WO WO-2016133344 A1 * 8/2016 ............ H04W 24/08
(Continued)

OTHER PUBLICATIONS

3GPP, "NR; NR and NG-RAN Overall Description; Stage 2", 3GPP TS 38.300 V15.1.0 (Mar. 2018) (Year: 2018).*
(Continued)

*Primary Examiner* — Robert M Morlan
(74) *Attorney, Agent, or Firm* — Studebaker & Brackett PC (57) ABSTRACT

A base station, communication control method used in a base station, and mobile communication system including a base station transmit a handover request message for handing over a wireless communication apparatus having a RRC connection with the base station to another base station. The handover message includes an Integrated Access and Backhaul (IAB) indication indicating that the wireless communication apparatus is an IAB node having a user equipment function and a base station function.

4 Claims, 8 Drawing Sheets

Related U.S. Application Data continuation of application No. PCT/JP2019/018527, filed on May 9, 2019.

(51) Int. Cl.
 *H04W 80/02* (2009.01)
 *H04W 92/04* (2009.01)

(56) References Cited

U.S. PATENT DOCUMENTS

| | | | |
|---|---|---|---|
| 2018/0042031 A1* | 2/2018 | Hampel | ........... H04W 72/04 |
| 2020/0305216 A1 | 9/2020 | Kim | |

FOREIGN PATENT DOCUMENTS

| | | | | |
|---|---|---|---|---|
| WO | WO-2016159000 A1 * | 10/2016 | ............ | H04W 24/10 |
| WO | 2018/026401 A1 | 2/2018 | | |
| WO | 2018/063435 A2 | 4/2018 | | |

OTHER PUBLICATIONS

Machine Translation of WO 2016159000 A1 (Year: 2016).*
Nokia et al.; Architecture and Protocols: MAC adaptation layer based IAB; 3GPP TSG-RAN WG3#99; R3-180993; Feb. 26-Mar. 2, 2018; total 6 pages; Athens, Greece.
AT&T; Motivation for Study on Integrated Access and Backhaul for NR; 3GPP RAN#75; RP-170217; Mar. 6-9, 2017; Dubrovnik, Croatia [online].
Samsung; Discussions on control plane protocol IAB; 3GPP TSG RAN WG2 #101bis R2-1804701; Apr. 16-20, 2018; Sanya, China [online].
CATT; "Considerations on startup procedure for L2 IAB architecture"; 3GPP TSG-RAN WG3 #99bis, R3-181756; Apr. 16-20, 2018; total 4 pages; Sanya, China.

* cited by examiner

| IAB NODE | DONOR CANDIDATE 1 | DONOR CANDIDATE 2 | DONOR CANDIDATE 3 | DONOR CANDIDATE 4 |
|---|---|---|---|---|
| IAB NODE#1 | gNB#1 | gNB#2 | gNB#3 | - |
| IAB NODE#2 | gNB#1 | gNB#3 | - | - |
| IAB NODE#3 | gNB#1 | gNB#4 | gNB#5 | gNB#6 |

MOBILE COMMUNICATION SYSTEM, RELAY NODE, AND BASE STATION

CROSS-REFERENCE TO RELATED APPLICATIONS

This application is a Continuation of U.S. patent application Ser. No. 17/093,035 filed on Nov. 9, 2020, which is a continuation based on PCT Application No. PCT/JP2019/018527 filed on May 9, 2019, which claims the benefit of Japanese Patent Application No. 2018-090447 filed on May 9, 2018. The content of which is incorporated by reference herein in their entirety.

TECHNICAL FIELD

The present disclosure relates to a mobile communication system, a relay node, and a base station.

BACKGROUND ART

The 3rd Generation Partnership Project (3GPP), which is a standardization project for mobile communication systems, is studying a new relay node called an Integrated Access and Backhaul (IAB) node. One or a plurality of relay nodes are involved in communications between a base station and user equipment, and relay the communications. Such a relay node has a user equipment function and a base station function, uses the user equipment function to perform radio communications with a upper node (base station or upper relay node), and uses the base station function for performing radio communications with a lower node (user equipment or lower relay node).

A radio section between the user equipment and the relay node or the base station may be referred to as an access link. A radio section between the relay node and the base station or another relay node may be referred to as a backhaul link. Non patent Literature 1 describes a method of integrating and multiplexing data communications in the access link and data communications in the backhaul link in Layer 2, and dynamically allocating radio resources to the backhaul link to dynamically switch the relay route.

CITATION LIST

Non Patent Literature

Non patent Literature 1: 3GPP Contribution RP-170217, "Motivation for Study on Integrated Access and Backhaul for NR", [online], [Searched on May 1, 2018], Internet <1525835583096_0.zip>

SUMMARY

A base station according to the present disclosure comprises a transmitter configured to transmit a handover request message for handing over a wireless communication apparatus having a RRC connection with the base station to another base station. The handover message includes an Integrated Access and Backhaul (IAB) indication indicating that the wireless communication apparatus is an IAB node having a user equipment function and a base station function.

A communication control method according to the present disclosure is used in a base station. The method comprises transmitting a handover request message for handing over a wireless communication apparatus having a RRC connection with the base station to another base station. The handover message includes an Integrated Access and Backhaul (IAB) indication indicating that the wireless communication apparatus is an IAB node having a user equipment function and a base station function.

A mobile communication system according to the present disclosure includes a base station and a wireless communication apparatus. The base station is configured to transmit a handover request message for handing over the wireless communication apparatus having a RRC connection with the base station to another base station. The handover message includes an Integrated Access and Backhaul (IAB) indication indicating that the wireless communication apparatus is an IAB node having a user equipment function and a base station function.

A relay node according to one embodiment is configured to have a user equipment function and a base station function. The relay node comprises: a controller configured to use the user equipment function to establish a Radio Resource Control, RRC, connection with a base station; and a receiver configured to receive, from the base station, a RRC reconfiguration message for establishing, while maintaining the RRC connection, a backhaul Radio Link Control, RLC, channel between the relay node and the base station.

A base station according to one embodiment comprises a controller configured to establish a Radio Resource Control, RRC, connection with a relay node configured to have a user equipment function and a base station function and a transmitter configured to transmit, to the relay node, a RRC reconfiguration message for establishing, while maintaining the RRC connection, a backhaul Radio Link Control, RLC, channel between the relay node and the base station.

A processor according to one embodiment is for controlling a relay node configured to have a user equipment function and a base station function. The processor is configured to execute processes of: using the user equipment function to establish a Radio Resource Control, RRC, connection with a base station; and receiving, from the base station, a RRC reconfiguration message for establishing, while maintaining the RRC connection, a backhaul Radio Link Control, RLC, channel between the relay node and the base station.

A method according to one embodiment is used in a relay node configured to have a user equipment function and a base station function. The method comprises: using the user equipment function to establish a Radio Resource Control, RRC, connection with a base station; and receiving, from the base station, a RRC reconfiguration message for establishing, while maintaining the RRC connection, a backhaul Radio Link Control, RLC, channel between the relay node and the base station.

DESCRIPTION OF EMBODIMENTS

A mobile communication system according to one embodiment will be described with reference to the accompanying drawings. Note that in the descriptions of the drawing below, identical or similar symbols are assigned to identical or similar portions.

(A Configuration of a Mobile Communication System)

Figure 1:
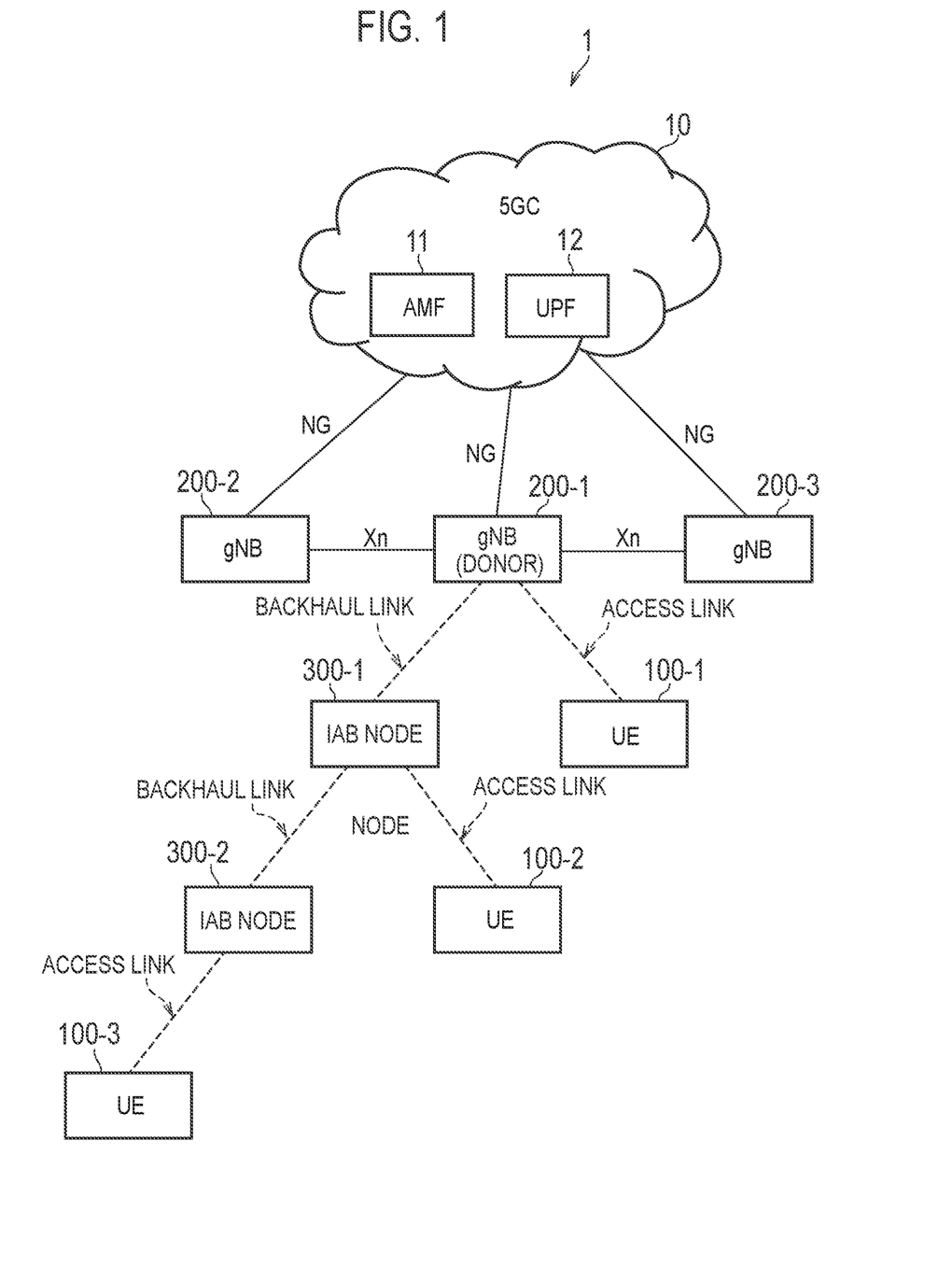
FIG. 1 is a diagram illustrating a configuration of a mobile communication system according to an embodiment.

A configuration of a mobile communication system according to this embodiment will be described. FIG. 1 is a diagram illustrating a configuration of a mobile communication system 1 according to this embodiment. The mobile communication system 1 is a 5G mobile communication system based on 3GPP standard. In particular, a radio access format in the mobile communication system 1 is NR which is a radio access format of 5G. However, LTE (Long Term Evolution) may be applied to the mobile communication system 1 at least partially.

As shown in FIG. 1, the mobile communication system 1 comprises a 5G core network (5GC) 10, a user equipment (UE) 100, a base station (referred to as gNB) 200, and an IAB node 300. In the present embodiment, an example in which the base station is an NR base station will be mainly described, but the base station may be an LTE base station (i.e., an eNB).

The 5GC 10 comprises an AMF (Access and Mobility Management Function) 11 and an UPF (User Plane Function) 12. The AMF 11 is an apparatus which performs various mobility control with respect to the UE 100, and the like. The AMF 11 manages information of an area in which the UE 100 exists by using non-access stratum (NAS) signaling to communicate with the UE 100. The UPF 12 is an apparatus which performs data transfer control, and like.

The gNB 200 is connected to the 5GC 10 via an interface referred to as an NG interface. In FIG. 1, three gNB 200-1 to gNB 200-3 connected to the 5GC 10 are illustrated. The gNB 200 is a fixed radio communication device which performs radio communication with the UE 100. When the gNB 200 has a donor function, the gNB 200 may perform radio communication with an IAB node which wirelessly connects to itself.

The gNB 200 is connected to another gNB 200 in an adjacent relationship via an inter-base station interface referred to as an Xn interface. FIG. 1 shows an example in which the gNB200-1 is connected to the gNB200-2 and the gNB200-2.

Each of the gNB 200 manages one or a plurality of cells. A cell is used as a term indicating the smallest unit of a radio communications area. A cell is also used as a term indicating a function or resource which performs radio communications with the UE 100. One cell belongs to one carrier frequency.

The UE 100 is a mobile radio communication device that performs radio communication with the gNB 200. The UE 100 may communicate with the IAB node 300. The UE 100 may be any device as long as it is a device that performs radio communication with the gNB 200 or the IAB node 300. For example, the UE 100 is a mobile phone terminal, a tablet terminal, a notebook PC, a sensor, a device installed in the sensor, a vehicle, or a device installed in vehicle.

FIG. 1 shows an example in which the UE 100-1 wirelessly connects to the gNB 200-1, the UE 100-2 wirelessly connects to the IAB node 300-1, and the UE 100-3 wirelessly connects to the IAB 300-2. The UE 100-1 directly communicates with the gNB 200-1. The UE 100-2 indirectly communicates with the gNB 200-1 via the IAB node 300-1. The UE 100-3 indirectly communicates with the gNB 200-1 via the IAB node 300-1 and the IAB node 300-2.

An IAB node 300 is a device (relay node) that is involved in communications between an eNB 200 and a UE 100 and relays the communications. FIG. 1 illustrates an example in which an IAB node 300-1 is in radio connection with a gNB 200-1 serving as a donor and an IAB node 300-2 is in wireless connection with the IAB node 300-1. Each IAB node 300 manages a cell. The cell managed by the IAB node 300 may have a cell ID that may be the same as or different from the cell ID of the cell of the donor gNB 200-1.

The IAB node 300 has a UE function (user equipment function) and a gNB function (base station function). The IAB node 300 uses the UE function to perform radio communications with a upper node (the gNB 200 or a upper IAB node 300), and also uses the gNB function to perform radio communications with a lower node (UE 100 or lower IAB node 300). The UE function is at least a part of the functions of the UE 100, and the IAB node 300 does not necessarily need to have all the functions of the UE 100. The gNB function is at least a part of the functions of the gNB 200, and the IAB node 300 does not necessarily need to have all the functions of the gNB 200.

A radio section between the UE 100 and the IAB node 300 or gNB 200 may be referred to as an access link (or Uu). A radio section between the IAB node 300 and the gNB 200 or another IAB node 300 may be referred to as a backhaul link (or Un). Such a backhaul link may be referred to as a fronthaul link.

A relay route can be dynamically switched by integrating and multiplexing data communications in the access link and data communications in the backhaul link in Layer 2, and dynamically allocating radio resources to data communications in the backhaul link. A millimeter wave band may be used for the access link and the backhaul link. In addition, the access link and the backhaul link may be time division and/or frequency division multiplexed.

(A Configuration of gNB)

Figure 2:
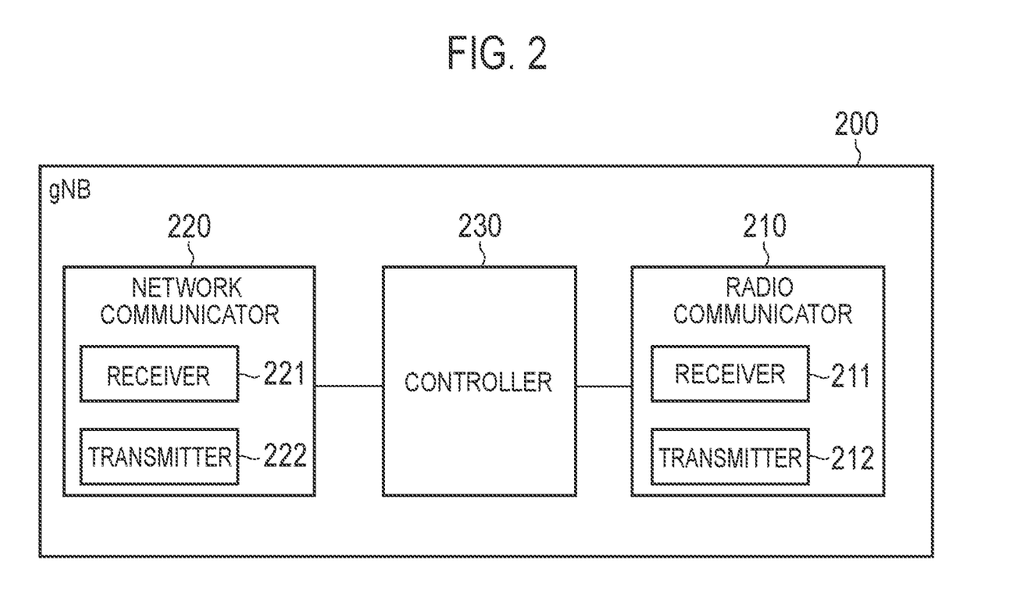
FIG. 2 is a diagram illustrating a configuration of a base station (gNB) according to the embodiment.

A configuration of the gNB 200 according to this embodiment will be described. FIG. 2 is a diagram illustrating a configuration of the gNB 200. As shown in FIG. 2, the gNB 200 comprises a radio communicator 210, a network communicator 220, and a controller 230.

The radio communicator 210 is used for radio communication with the UE 100 and radio communication with the IAB node 300. The radio communicator 210 includes a receiver 211 and a transmitter 212. The receiver 211 performs various receptions under the control of the controller 230. The receiver 211 includes an antenna and converts a radio signal received by the antenna into a baseband signal (received signal) and outputs the baseband signal to the controller 230. The transmitter 212 performs a variety of transmission under the control of the controller 230. The transmitter 212 includes an antenna and converts the baseband signal (transmitted signal) output from the controller 230 into the radio signal and transmits the radio signal from the antenna.

The network communicator 220 is used for wired communication (or wireless communication) with the 5GC 10 and wired communication (or wireless communication) with another adjacent gNB 200. The network communicator 220 includes a receiver 221 and a transmitter 222. The receiver 221 performs various receptions under the control of the controller 230. The receiver 221 receives a signal from the outside and outputs the reception signal to the controller 230. The transmitter 222 performs a variety of transmission under the control of the controller 230. The transmitter 222 transmits, to the outside, a transmission signal output from the controller 230.

The controller 230 performs various controls in the gNB 200. The controller 230 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of IAB Node)

Figure 3:
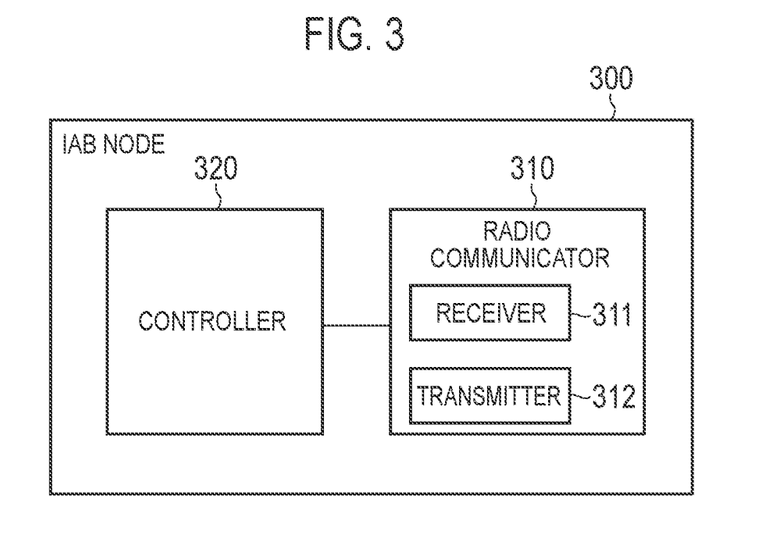
FIG. 3 is a diagram illustrating a configuration of a relay node (IAB node) according to the embodiment.

A configuration of the IAB node 300 according to this embodiment will be described. FIG. 3 is a diagram illustrating a configuration of the IAB node 300. As shown in FIG. 3, the IAB node 300 comprises a radio communicator 310 and a controller 320.

The radio communicator 310 is used for radio communication with the gNB 200 (backhaul link) and radio communication with the UE 100 (access link). The radio communicator 310 includes a receiver 311 and a transmitter 312. The receiver 311 performs various receptions under the control of the controller 320. The receiver 311 includes an antenna and converts a radio signal received by the antenna into a baseband signal (received signal) and outputs the baseband signal to the controller 320. The transmitter 312 performs a variety of transmission under the control of the controller 320. The transmitter 312 includes an antenna and converts the baseband signal (transmitted signal) output from the controller 320 into the radio signal and transmits the radio signal from the antenna.

The controller 320 performs various controls in the IAB node 300. The controller 320 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of UE)

Figure 4:
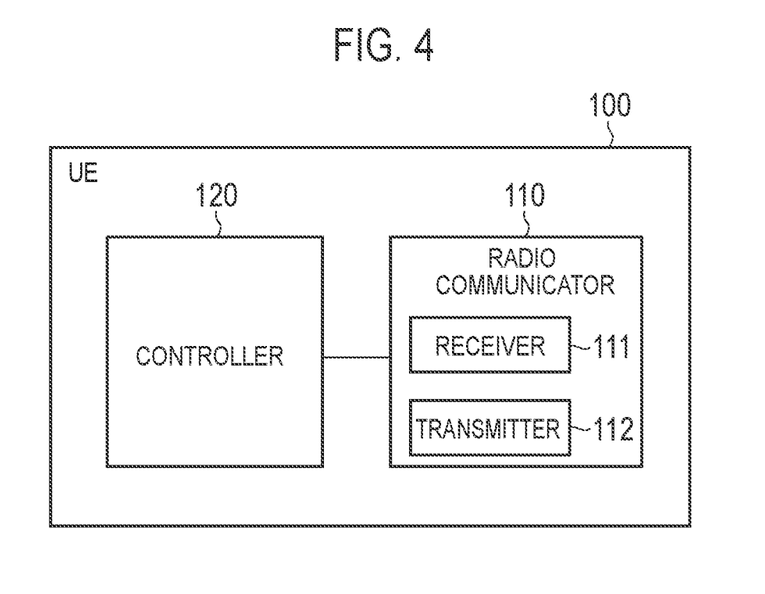
FIG. 4 is a diagram illustrating a configuration of user equipment (UE) according to the embodiment.

A configuration of the UE 100 according to this embodiment will be described. FIG. 4 is a diagram illustrating a configuration of the UE 100. As shown in FIG. 4, the UE 100 comprises a radio communicator 110 and a controller 120.

The radio communicator 110 is used for radio communication in access link, i.e., radio communication with the gNB 200 and radio communication with the IAB node 300. The radio communicator 110 includes a receiver 111 and a transmitter 112. The receiver 111 performs various receptions under the control of the controller 120. The receiver 111 includes an antenna and converts a radio signal received by the antenna into a baseband signal (received signal) and outputs the baseband signal to the controller 120. The transmitter 112 performs a variety of transmission under the control of the controller 120. The transmitter 112 includes an antenna and converts the baseband signal (transmitted signal) output from the controller 120 into the radio signal and transmits the radio signal from the antenna.

The controller 120 performs various controls in the UE 100. The controller 120 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(Example of Protocol Stack Configuration)

Figure 5:
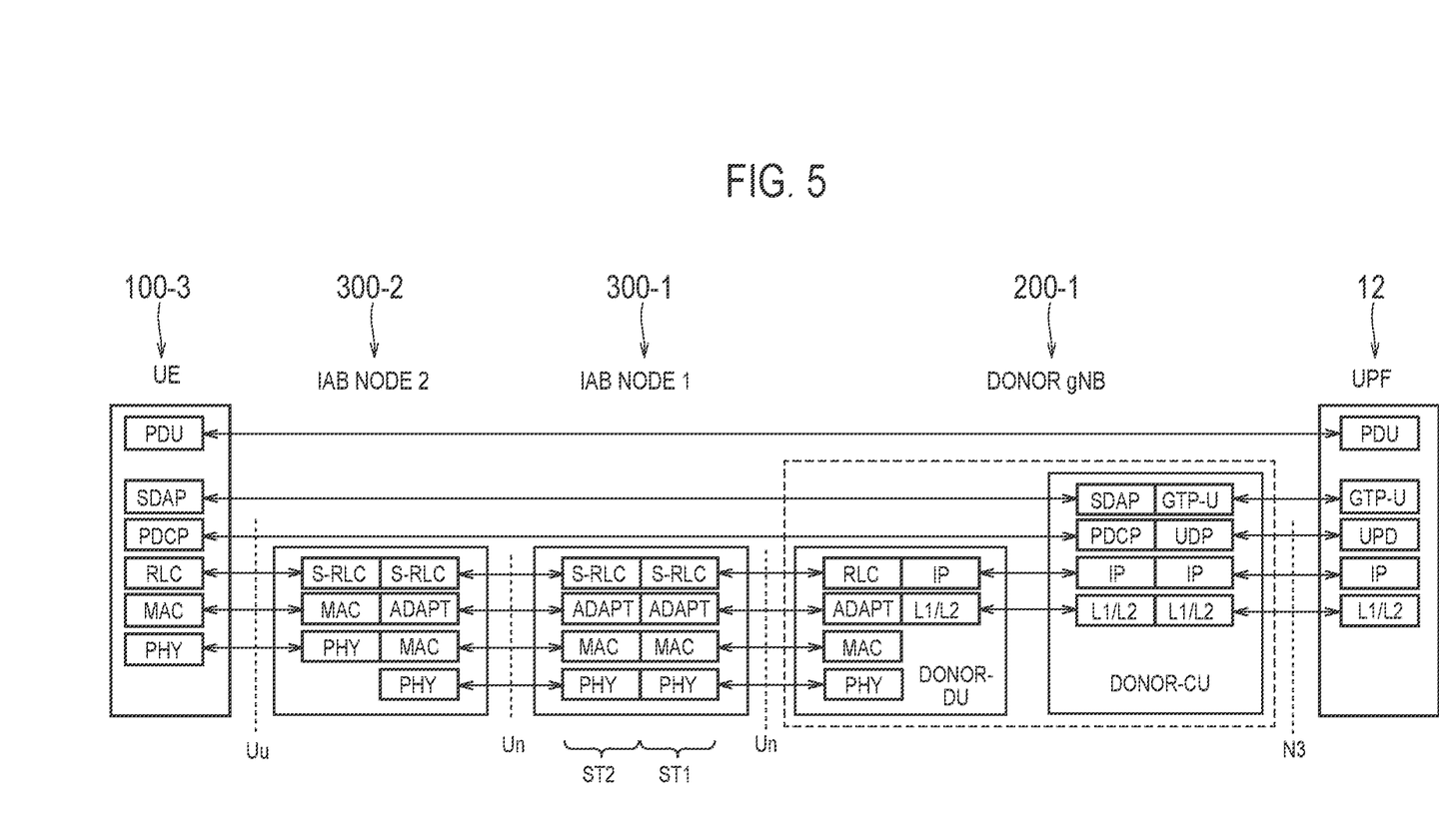
FIG. 5 is a diagram illustrating an example of a protocol stack configuration of a user plane in the mobile communication system according to the embodiment.

An example of a protocol stack configuration in the mobile communication system 1 according to the present embodiment will be described. FIG. 5 is a diagram illustrating an example of a protocol stack configuration of a user plane. Here, an example of a protocol stack configuration related to user data transmission between a UE 100-3 and a UPF 12 in a 5GC 10 illustrated in FIG. 1 will be described.

As illustrated in FIG. 5, the UPF 12 includes a GPRS Tunneling Protocol for User Plane (GTP-U), User Datagram Protocol (UDP), Internet Protocol (IP), and Layer 1/Layer 2 (L1/L2). The gNB 200-1 (donor gNB) is provided with a protocol stack corresponding to these.

The gNB 200-1 includes a central unit (CU) and a distributed unit (DU). In the protocol stack of the radio interface, Packet Data Convergence Protocol (PDCP) and higher layers are provided to the CU, and Radio Link Control (RLC) and lower layers are provided to the DU. The CU and the DU are connected to each other via an interface referred to as an F1 interface.

Specifically, the CU includes Service Data Adaptation Protocol (SDAP), PDCP, IP, and L1/L2. SDAP and PDCP of the CU communicate with SDAP and PDCP of the UE 100 via the DU, the IAB node 300-1, and the IAB node 300-2.

The DU includes an RLC, an adaptation layer (Adapt), Medium Access Control (MAC), and a Physical layer (PHY) in the protocol stack of the radio interface. A protocol stack of these is a protocol stack for a gNB. The hierarchical relationship between the adaptation layer and the RLC (S-RLC) may be reversed.

The IAB node 300-1 is provided with a protocol stack ST1 that is for UE and corresponds to these. Furthermore, the IAB node 300-1 is provided with a protocol stack ST2 for gNB. The protocol stack ST1 and the protocol stack ST2 each include Layer 2 and lower layers (sublayers). Thus, the IAB node 300-1 is a Layer 2 relay node that relays user data using Layer 2 and lower layers. The IAB node 300-1 performs relays the data without using Layer 3 and higher layers (specifically, PDCP and higher layers). The IAB node 300-2 has a protocol stack configuration similar to that of the IAB node 300-1.

The protocol stack configuration in the user plane is as described above. In a control plane on the other hand, the gNB 200-1, the IAB node 300-1, the IAB node 300-2, and the UE 100-3 each have Radio Resource Control (RRC) corresponding to Layer 3.

An RRC connection is established between the RRC of the gNB 200-1 (donor gNB) and the RRC of the IAB node 300-1, and RRC messages are transmitted and received using this RRC connection. An RRC connection is established between the RRC of the gNB 200-1 and the RRC of the IAB node 300-2, and RRC messages are transmitted and received using this RRC connection. Furthermore, an RRC connection is established between the RRC of the gNB 200-1 and the RRC of the UE 100-3, and RRC messages are transmitted and received using this RRC connection.

(Operation in Mobile Communication System)

An operation in the mobile communication system 1 according to the present embodiment will be described. Specifically, an operation performed in a case where the IAB node 300-1 establishes a radio connection to the gNB 200-1 (donor gNB) will be described.

In such a case, the IAB node 300-1 first establishes an access link connection (first radio connection) with the gNB 200-1 by using the UE function. In other words, the IAB node 300-1 functions as the UE 100 to establish an access link connection with gNB 200-1. The establishment of the access link connection includes establishment of the RRC connection.

Next, the gNB 200-1 transmits to the IAB node 300-1, a message for establishing a backhaul link connection (second radio connection) between the IAB node 300-1 and the gNB 200-1 for the gNB function of the IAB node 300-1, while maintaining the access link connection. In the present embodiment, this message is an RRC Reconfiguration message transmitted and received using the RRC connection.

As a result, the backhaul link connection is established between the IAB node 300-1 and the gNB 200-1, whereby backhaul link communications between the IAB node 300-1 and the gNB 200-1 can be started properly.

The RRC reconfiguration message for establishing the backhaul link connection may include configuration information on a bearer (or L2 link) forming the backhaul link connection, and a cell ID (specifically, transmission configuration on a reference signal and a synchronization signal associated with the cell ID) to be transmitted by the IAB node 300-1. Such an RRC reconfiguration message will be hereinafter referred to as an IAB node configuration message.

The IAB node configuration message may include configuration information on a default bearer (or default link). The default bearer (or default link) is, for example, a bearer (or link) for relaying SIB and relaying Msg3 from UE.

The IAB node configuration message may include configuration information on the stack on the side of the donor gNB 200-1 and may optionally include configuration information on the stack on the side of the IAB node 300-2 (or UE 100). The configuration information on the stack on the side of the IAB node 300-2 (or UE 100) may be configured (in advance) by an operator (OAM) or a group of configurations implicitly notified using the SIB of the donor gNB 200-1 may be reused therefor.

The configuration contents in the IAB node configuration message basically include all the configurations included in the RRC reconfiguration message, and may also include an RLC configuration (an operation mode such as Acknowledged Mode (AM)/Unacknowledged Mode(UM)/Transparent Mode(TM), Logical Channel Prioritization (LCP) parameter, and the like), a MAC configuration (such as Buffer Status Report (BSR)/Timing Advance Group (TAG)/Power Headroom (PHR) parameters, and Discontinues Reception (DRX) configuration), and PHY configuration.

The configuration contents in the IAB node configuration message may further include a configuration of an adaptation layer (such as mapping (routing) configuration and priority configuration of lower side or higher side logical channel).

Furthermore, the configuration contents in the IAB node configuration message may include the (virtual) IP address (that is, the L3 address) of the IAB node 300-1 as appropriate. This is because the F1 protocol stack assumes SCTP over IP to be used for establishing an F1 interface on an L2 link for example.

The configuration contents in the IAB node configuration message is not limited to the configuration information on the NR protocol, but may be configuration information on the LTE protocol (RLC, MAC, PHY).

In the present embodiment, the IAB node 300-1 may transmit, to the gNB 200-1, an indication indicating that the IAB node 300-1 has the function of the IAB node (that is, the Layer 2 relay function) before establishment of the backhaul link connection or requests establishment of the backhaul link connection. This enables the gNB 200-1 to properly initiate a procedure for establishing the backhaul link connection. Hereinafter, such an indication will be referred to as an IAB indication. The IAB indication may include information indicating intention or capability for preparing the link protocol stack for the UE function in the IAB node 300-1 with LTE, NR, or both.

Note that the IAB node 300-1 may transmit the IAB indication after establishing the access link connection with the gNB 200-1, or transmit the IAB indication during the procedure for establishing the access link connection with gNB 200-1.

Furthermore, a condition for enabling the IAB indication to be transmitted to the gNB may include a condition that, from the gNB, the SIB including a donor function identifier indicating the gNB has the donor function has been received. Under such a condition, the IAB node 300-1 transmits the IAB indication to the gNB 200-1 only when the donor function identifier is received from the gNB 200-1 by the SIB.

In the present embodiment, when the gNB 200-1 has the donor function for establishing the backhaul link connection with the IAB node 300-1, the gNB 200-1 that has received the IAB indication from the IAB node 300-1 may transmit the IAB node configuration message to the IAB node 300-1. On the other hand, when the gNB 200-1 does not have the donor function, the gNB 200-1 that has received the IAB indication from the IAB node 300-1 may transmit a handover request for requesting the handover of the IAB node 300-1 to another gNB, instead of transmitting the IAB node configuration message to the IAB node 300-1. Preferably, the gNB 200-1 has information on another gNB having the donor function, stored in advance. The gNB 200-1 may acquire the information on the other gNB having the donor function from the IAB node 300-1. The IAB node 300-1 acquires the information from the 5GC 10 (core network) or checks the SIB (donor function identifier) of the adjacent cell to acquire the information on the other gNB (adjacent cell) having the donor function, and notifies the gNB 200-1 of the acquired information. The gNB 200-1 transmits a handover request to the other gNB having the donor function based on the stored information or the information acquired from the IAB node 300-1. As a result, after the IAB node 300-1 has been handed over to the other gNB, the IAB node 300-1 can establish the backhaul link connection with the other gNB. Alternatively, when the gNB 200-1 does not have the donor function, the IAB node 300-1 requests the 5GC 10 to perform the handover to the cell (gNB) having the donor function, and the 5GC 10 may execute processing related to the handover.

In the present embodiment, the gNB 200-1 may transmit a measurement configuration for configuring radio measurement to the IAB node 300-1 in response to the reception of the IAB indication from the IAB node 300-1. After receiving the measurement configuration from the gNB 200-1, the IAB node 300-1 transmits a measurement report including the result of the radio measurement to the gNB 200-1. The gNB 200-1 determines whether it (gNB 200-1) is the appropriate donor gNB or another gNB is the appropriate donor gNB, based on the measurement report from the IAB node 300-1. For example, based on the measurement reports, the gNB 200-1 determines that the other gNB is the appropriate donor gNB, when the measurement result for the other gNB is better than the own measurement result (for the gNB 200-1) with a difference between these measurement reports exceeding a threshold. Otherwise, the gNB 200-1 determines that it is the appropriate donor gNB.

Upon determining that it (gNB 200-1) is the appropriate donor gNB 200-1, the gNB 200-1 transmits an IAB node configuration message to the IAB node 300-1. Upon determining that another gNB is the appropriate donor gNB, the gNB 200-1 transmits a handover request for requesting the handover of the IAB node 300-1 to the other gNB, instead of transmitting the IAB node configuration message to the IAB node 300-1. Thus, after the IAB node 300-1 has been handed over to the other gNB under an excellent radio condition, the IAB node 300-1 can establish the backhaul link connection with the other gNB.

In the present embodiment, the gNB 200-1 may transmit context information about the IAB node 300-1 to another gNB after establishing the backhaul link connection. This context information includes AS layer connection configuration on the radio side (content of RRC reconfiguration), PDU session resource configuration on the network side (such as UE ID and session ID, QoS/slice configuration of AMF or RAN), and other related information (such as history information and preference information on behavior, communications, and the like of the IAB node.

Specifically, the gNB 200-1 transmits the context information about the IAB node 300-1 to another gNB in advance even without determining that the IAB node 300-1 is to be handed over to another gNB. Thus, when the radio condition between the gNB 200-1 and the IAB node 300-1 deteriorates and thus the IAB node 300-1 reestablishes the radio connection with another gNB, the reestablishment can be swiftly implemented using the context information shared in advance.

Here, the gNB 200-1 preferably holds a table in which the IAB node 300-1 is associated with candidates of the donor gNB for the IAB node 300-1. The gNB 200-1 transmits the context information to other gNBs that are the candidates in the table. This allows the gNB 200-1 to share the context information with the other appropriate gNBs.

(1) Example of Normal Operation Sequence

Figure 6:
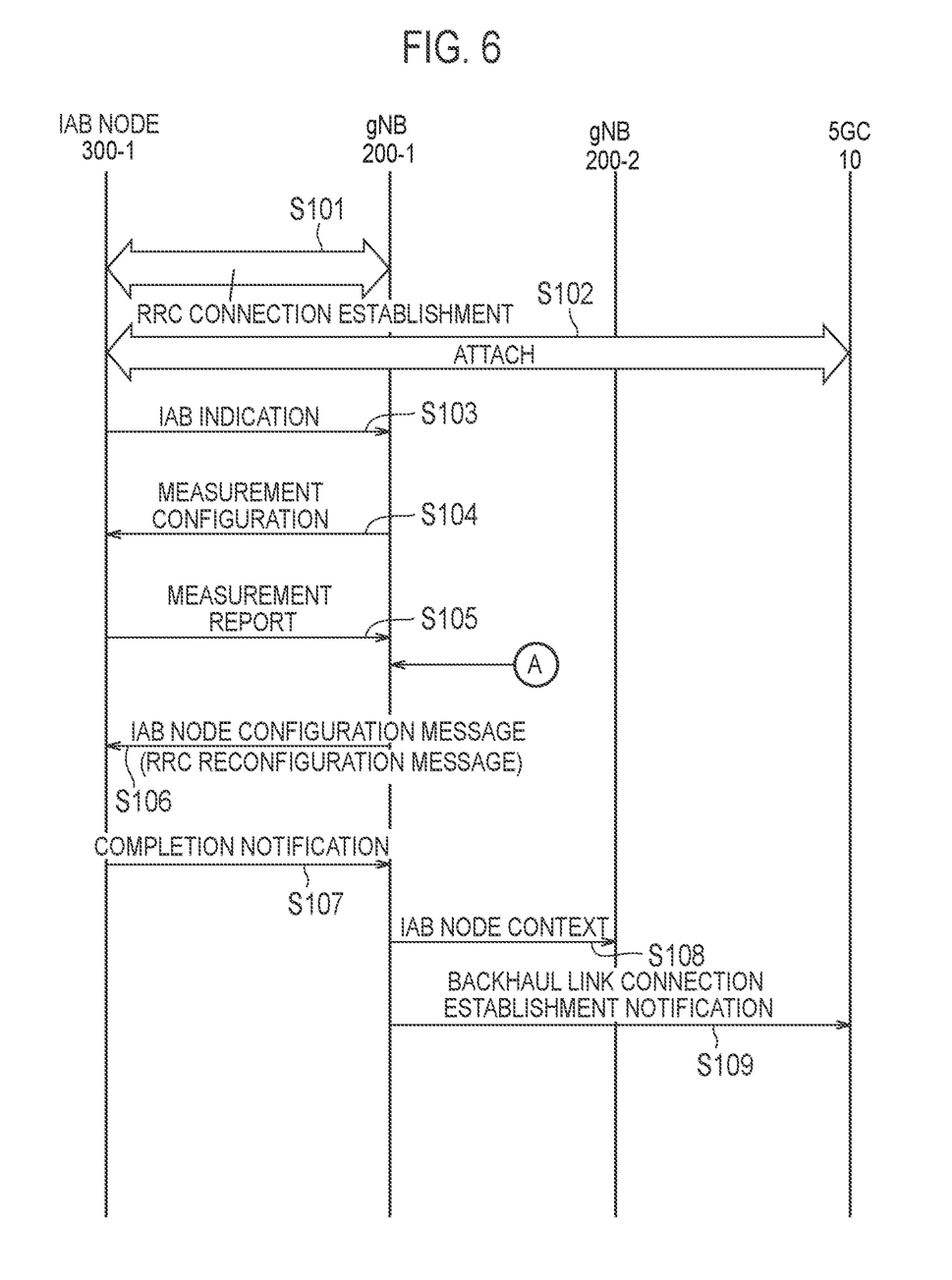
FIG. 6 is a diagram illustrating an example of a normal operation sequence in the mobile communication system according to the embodiment.

FIG. 6 is a diagram illustrating an example of a normal operation sequence in the mobile communication system 1 according to the present embodiment.

As illustrated in FIG. 6, in step S101, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S101.

In step S102, the IAB node 300-1 performs an attach procedure to the 5GC 10 (specifically, AMF 11) via the gNB 200-1. Here, the IAB node 300-1 may notify the AMF 11 of a notification such as the IAB indication (that is, a notification indicating an intention to function as an IAB node). Thus, the IAB node 300-1 may acquire the list of candidate donor gNBs (cells), routing information indicating presence/absence of a lower node, other management information, and the like from the AMF 11. Alternatively, context information such as information indicating that the IAB node 300-1 is attached to each candidate donor gNB and routing information of the IAB node 300-1 may be notified from the AMF 11. If the IAB node 300-1 is already attached, the attach processing in step S102 can be omitted. Specifically, the attach processing by the IAB node 300-1 is omitted when the connection with the donor gNB needs to be reestablished due to a certain error, as in the RRC reestablishment in step S101.

In step S103, the IAB node 300-1 transmits the IAB indication to the gNB 200-1. The transmission of the IAB indication by the IAB node 300-1 may be triggered by satisfaction of one or a plurality of the following events.

When Msg5 (RRC Complete) is transmitted.

When the connection with gNB is established (this may be Msg5 and after, for example, when the first RRC reconfiguration is done).

When IAB configuration information (refer to the above description) is acquired from the AMF (including a case where IAB configuration information is already held).

Simply when there is an intention to function as an IAB node (including receiving an instruction to function as an IAB node from a higher layer).

When request to function as an IAB node is received from a lower IAB node 300-2 or UE 100-3 (when a signal indicating such a request is received from the lower IAB node 300-2 or the UE 100-3).

When the lower IAB node 300-2 or the UE 100-3 is already connected.

The IAB node 300-1 transmits the RRC message including the IAB indication to the gNB 200-1, for example. Such an RRC message may be a "UE Capability Information" message indicating the capability to function as a UE. Note that if the IAB indication is transmitted in step S101, step S103 can be omitted.

Alternatively, the AMF 11 may notify the gNB 200-1 of the IAB indication in a form of a change in the PDU session resource. The AMF may be an AMF for IAB management (dedicated).

The description on this normal operation sequence is given under an assumption that the gNB 200-1 has the donor capability. The gNB 200-1 determines that the backhaul link connection needs to be established with the IAB node 300-1, based on the IAB indication.

In step S104, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S105, IAB node 300-1 transmits a measurement report including the results of the radio measurement to the gNB 200-1. The gNB 200-1 determines whether it (gNB

200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S104 and S105 is not essential and may be omitted.

In step S106, the gNB 200-1 transmits an IAB node configuration message (RRC reconfiguration message) to the IAB node 300-1. The IAB node configuration message may include a handover instruction designating the cell of the gNB 200-1 (i.e., the current serving cell of the IAB node 300-1) as the handover destination. The IAB node 300-1 executes processing of establishing a backhaul link connection with the gNB 200-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S107, the IAB node 300-1 transmits a completion notification message to the gNB 200-1. The message indicates that the IAB node configuration, including the establishment of the backhaul link connection, has been completed. After step S107, the IAB node 300-1 functions as an IAB node instead of functioning as a UE, for the gNB 200-1.

Figure 7:
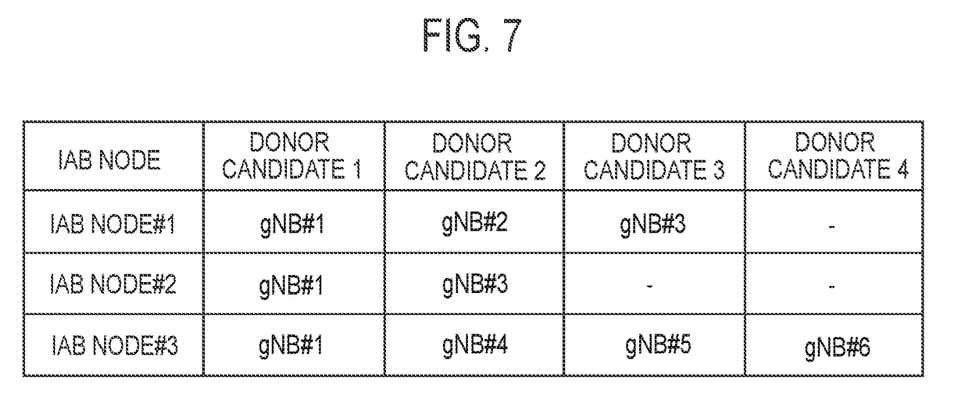
FIG. 7 is a diagram illustrating an example of a table for determining a context transfer destination according to the embodiment.

In step S108, the gNB 200-1 transfers the context information acquired in step S101 to the gNB 200-2 over an Xn interface. The gNB 200-1 holds a table that associates the IAB node 300-1 with the candidate of the donor gNB of the IAB node 300-1, and determines the context transfer destination by referring to this table. With the gNB 200-1 thus transferring the context to other gNBs in advance, when the condition of the radio connection with the gNB connected to the IAB node 300-1 deteriorates, reconnection with the other gNB can be established immediately. FIG. 7 is a diagram illustrating an example of a table for determining the context transfer destination. Such a table is configured in advance for each gNB by, for example, an operator. As illustrated in FIG. 7, in the table, each IAB node is associated with candidates of the donor gNB for the IAB node. Specifically, each identifier related to the IAB node is associated with an identifier of a candidate of the donor gNB for the IAB node. For example, a gNB geographically close to an IAB node is configured to be a candidate of the donor gNB for that IAB node. Although an example of association with the gNB is described, association with cell IDs may be made. The cell ID may be a physical layer cell ID or a global cell ID. In addition, the gNB 200-1 may determine a gNB 200-1 geographically close to IAB node 300-1 as a donor candidate, based on the measurement report received from the IAB node 300-1. The gNB 200-1 may generate a table in which the IAB node 300-1 is associated with the candidate of the donor gNB for the IAB node 300-1 or update an existing such table, based on the determined donor candidate.

In step S109, the gNB 200-1 transmits a notification to the 5GC 10, indicating that the backhaul link connection with the IAB node 300-1 has been established. Alternatively, the gNB 200-1 may transmit a request to establish a PDU session for the IAB node to the 5GC 10. As described above, the PDU session establishment request may be transmitted from the AMF 11 to the gNB 200-1 before step S109 or in step S109.

(2) Example of Exceptional Operation Sequence

Figure 8:
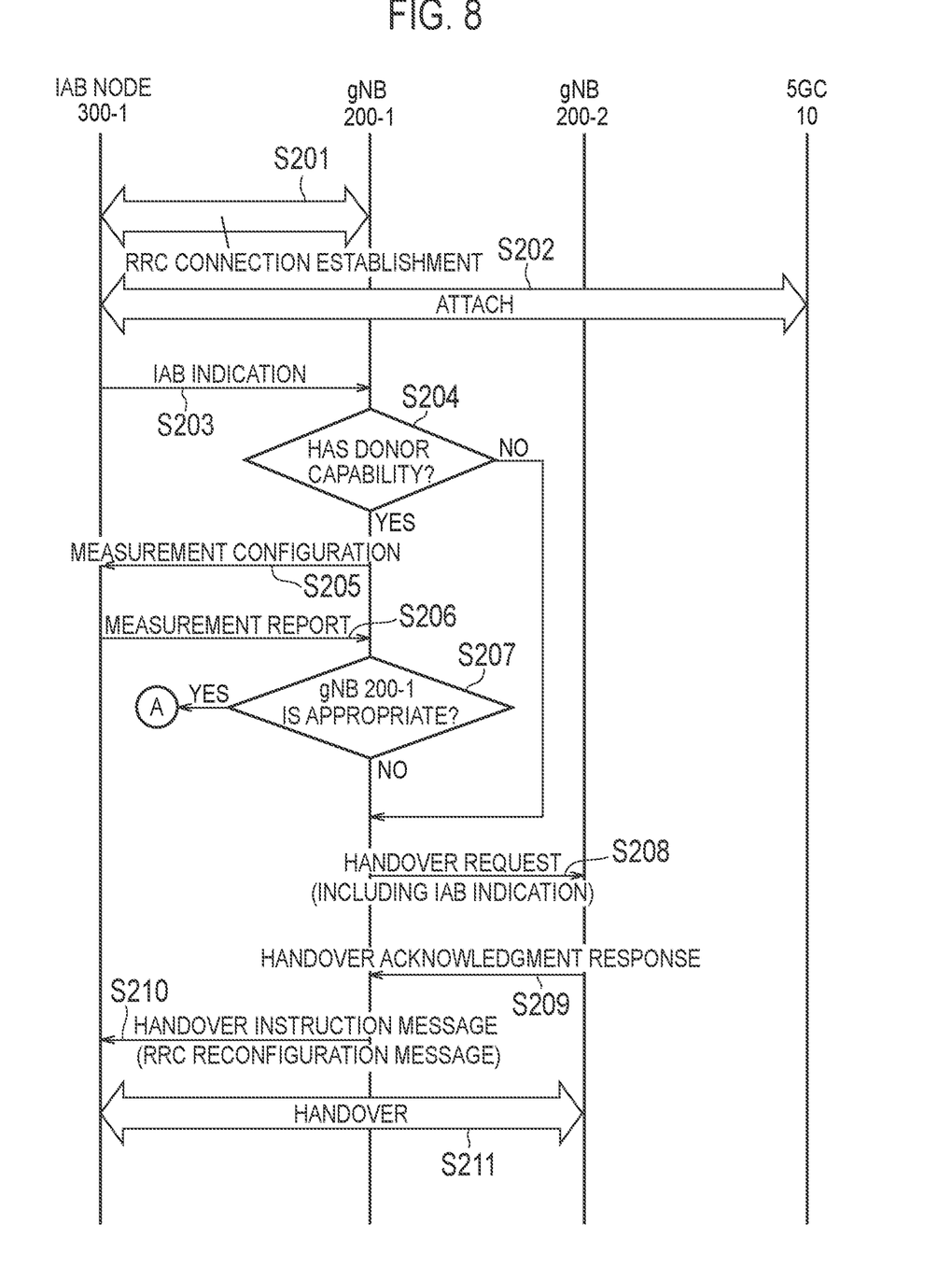
FIG. 8 is a diagram illustrating an example of an exceptional operation sequence in the mobile communication system according to the embodiment.

FIG. 8 is a diagram illustrating an example of an exceptional operation sequence in the mobile communication system 1 according to the present embodiment. In the exceptional operation sequence, the gNB 200-1 implements handover of the IAB node 300-1 to the gNB 200-2.

As illustrated in FIG. 8, in step S201, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S201.

In step S202, the IAB node 300-1 performs an attach procedure to the 5GC 10 (specifically, AMF 11) via the gNB 200-1.

In step S203, the IAB node 300-1 transmits the IAB indication to the gNB 200-1. The IAB node 300-1 transmits the RRC message including the IAB indication to the gNB 200-1, for example. Such an RRC message may be a "UE Capability Information" message indicating the capability of a UE. Note that if the IAB indication is transmitted in step S201, step S203 can be omitted.

In step S204, the gNB 200-1 determines whether it has the donor capability. If the gNB 200-1 does not have the donor capability (step S204: NO), gNB 200-1 advances the processing to step S208.

If the gNB 200-1 has the donor capability (step S204: YES), in step S205, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S206, the IAB node 300-1 transmits a measurement report including the results of the radio measurement to the gNB 200-1.

In step S207, the gNB 200-1 determines whether it (gNB 200-1) is the appropriate donor gNB or another gNB is the appropriate donor gNB, based on the measurement report. Upon determining that it (gNB 200-1) is the appropriate donor gNB (step S207: YES), the gNB 200-1 advances the processing to step S106 in the above-mentioned normal operation sequence (see FIG. 6).

On the other hand, upon determining that another gNB is the appropriate donor gNB (step S207: NO), the gNB 200-1 advances the processing to step S208.

In step S208, the gNB 200-1 transfers the handover request message including the IAB indication received from the IAB node 300-1, to the gNB 200-2 over the Xn interface. The gNB 200-1 may provide the context information acquired in step S201, in the handover request message. Alternatively, the gNB 200-1 may transmit the handover request message including information indicating a request for the IAB node 300-1 to function as the donor gNB for the gNB, instead of including the IAB indication. In step S208, the gNB 200-1 may transfer the handover request message to the gNB 200-2 over the Xn interface, upon determining that the gNB 200-2 has the donor capability. Specifically, for example, when the gNB 200-1 determines that gNB 200-2 is associated with IAB node 300-1 as a donor candidate based on the table illustrated in FIG. 7, the gNB 200-1 may transfer the handover request message to the gNB 200-2. In this case, the gNB 200-2 is less likely to reject the handover request, whereby the IAB node 300-1 can be handed over more swiftly. Alternatively, information about own donor capability may be shared in advance between a plurality of gNB 200s adjacent to each other, via the Xn interface. Thus, the gNB 200-1 can identify the adjacent gNB 200 having the donor capability, and can transfer the handover request message to the adjacent gNB 200 thus identified.

The gNB 200-2 determines whether to accept the handover of the IAB node 300-1, while taking the IAB indication included in the handover request message into consideration. The gNB 200-2 may reject the handover request if it does not have the donor capability. Here, the description will be given under an assumption that the gNB 200-2 has determined to accept the handover of the IAB node 300-1.

In step S209, the gNB 200-2 transmits a handover acknowledgment response message to the gNB 200-1 over the Xn interface.

In step S210, the gNB 200-1 transmits a handover instruction message (RRC reconfiguration message) to the IAB node 300-1, based on the handover acknowledgment response message from the gNB 200-2. The handover instruction message includes information for designating the (cell) of the handover destination gNB 200-2.

In step S211, the IAB node 300-1 performs handover to the gNB 200-2 based on the handover instruction message from the gNB 200.

(3) Example of a Multi-Hop Connection Sequence

Figure 9:
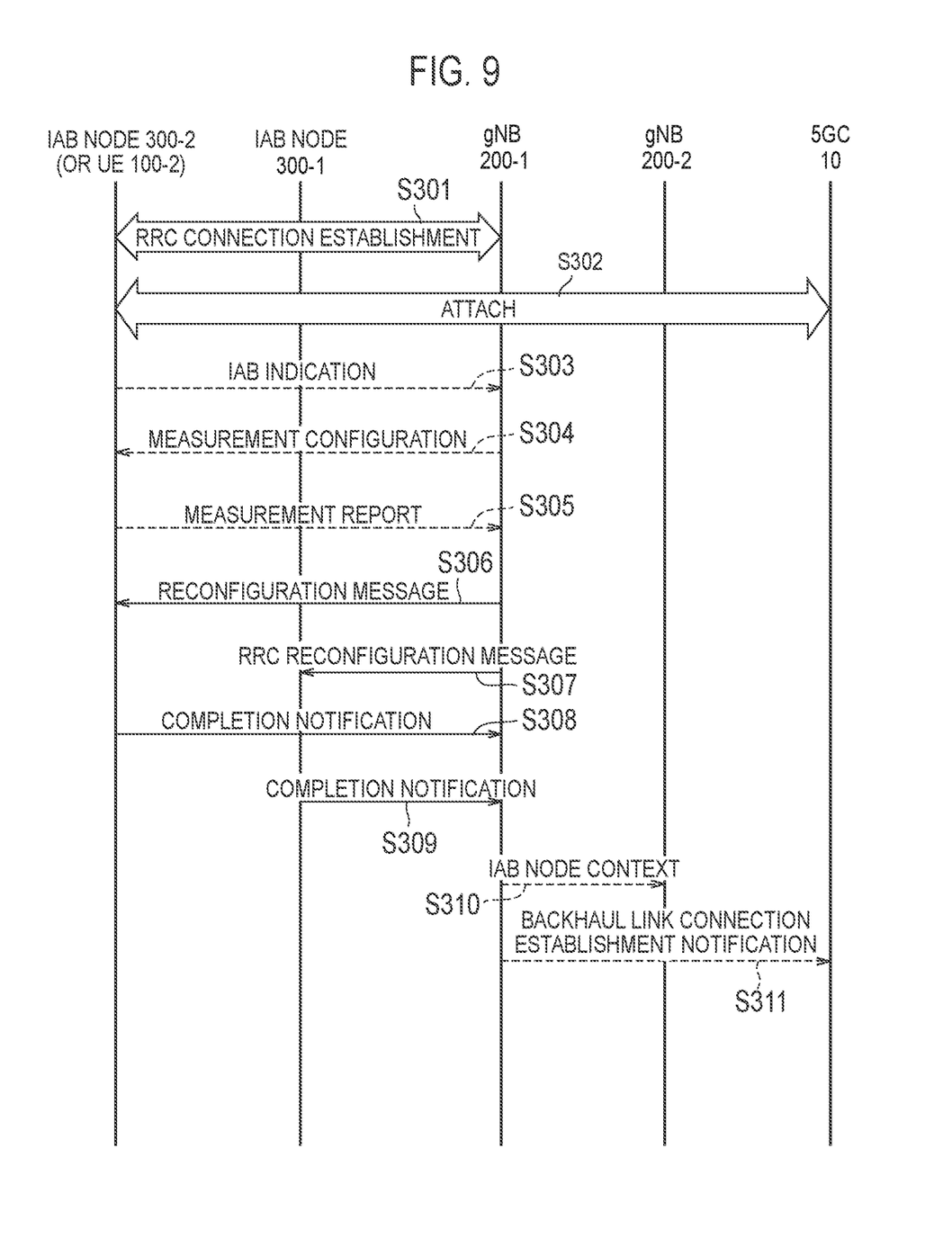
FIG. 9 is a diagram illustrating an example of a multi-hop connection sequence in the mobile communication system according to the embodiment.

FIG. 9 is a diagram illustrating an example of a multi-hop connection sequence in the mobile communication system 1 according to the present embodiment. The multi-hop connection sequence is a sequence for the IAB node 300-2 or the UE 100-2 to be connected to the IAB node 300-1 after the backhaul link connection has been connected between the IAB node 300-1 and gNB 200-1. Here, a case where the IAB node 300-2 is connected to the IAB node 300-1 will be mainly described, but the IAB node 300-2 may be replaced with the UE 100-2 as appropriate. Furthermore, the description that has already been made in the above-mentioned "(1) Normal operation sequence" will be omitted.

As illustrated in FIG. 9, in step S301, the IAB node 300-2 establishes an access link connection (RRC connection) with the gNB 200-1 by performing a random access procedure for the gNB 200-1 via the IAB node 300-1. The IAB node 300-2 may transmit a message (e.g., Msg3) including the IAB indication to the gNB 200-1 during the random access procedure. The gNB 200-1 acquires context information about the IAB node 300-2 in step S301.

In step S302, the IAB node 300-2 performs an attach procedure to the 5GC 10 (specifically, AMF 11) via the IAB node 300-2 and the gNB 200-1. Here, the IAB node 300-2 may notify the AMF 11 of a notification such as the IAB indication (that is, a notification indicating an intention to function as an IAB node). Thus, the IAB node 300-2 may acquire the list of candidate donor gNBs (cells), routing information indicating presence/absence of a lower node, other management information, and the like from the AMF 11. Alternatively, context information such as information indicating that the IAB node 300-2 is attached to each candidate donor gNB and routing information of the IAB node 300-2 may be notified from the AMF 11. If the IAB node 300-2 is already attached, the attach processing in step S302 can be omitted. Specifically, the attach processing by the IAB node 300-2 is omitted when the connection with the donor gNB needs to be reestablished due to a certain error, as in the RRC reestablishment.

In step S303, the IAB node 300-2 transmits the IAB indication to the gNB 200-1 via the IAB node 300-1. What triggers the transmission of the IAB indication by the IAB node 300-2 may be similar to that described in step S103 of "(1) Normal operation sequence" described above.

The IAB node 300-2 transmits the RRC message including the IAB indication to the gNB 200-1, for example. Such an RRC message may be a "UE Capability Information" message indicating the capability to function as a UE. Note that if the IAB indication is transmitted in step S301, step S303 can be omitted.

Alternatively, the AMF 11 may notify the gNB 200-1 of the IAB indication in a form of a change in the PDU session resource. The AMF may be an AMF for IAB management (dedicated).

Since the gNB 200-1 is assumed to have the donor capability in this operation sequence, the gNB 200-1 determines that the backhaul link connection needs to be established between the IAB node 300-1 and IAB node 300-2 based on the IAB indication.

In step S304, the gNB 200-1 transmits the measurement configuration for configuring the radio measurement, to the IAB node 300-2. The IAB node 300-2 performs the radio measurement based on the measurement configuration.

In step S305, the IAB node 300-2 transmits a measurement report including the results of the radio measurement to the gNB 200-1 via the IAB node 300-1. The gNB 200-1 determines whether it (gNB 200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S304 and S305 is not essential and may be omitted.

In step S306, the gNB 200-1 transmits an IAB node configuration message (RRC reconfiguration message) to the IAB node 300-2. The IAB node 300-2 executes processing of establishing a backhaul link connection with the IAB node 300-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S307, the gNB 200-1 transmits an RRC reconfiguration message to the IAB node 300-1. Such an RRC reconfiguration message is a message for changing the configuration in the IAB node 300-1 due to the addition of the IAB node 300-2. Such an RRC reconfiguration message includes, for example, mapping information indicating association between a logical channel of the IAB node 300-2 and a logical channel of the backhaul link of the IAB node 300-1. Note that step S307 may be executed before step S306 or concurrently with step S306.

In step S308, the IAB node 300-2 transmits a completion notification message to the gNB 200-1. The message indicates that the IAB node configuration, including the establishment of the backhaul link connection with the IAB 300-1, has been completed. After step S308, the IAB node 300-2 functions as an IAB node instead of functioning as a UE, for the gNB 200-1.

In step S309, the IAB node 300-1 transmits a completion notification message to the gNB 200-1. The message indicates that the configuration change due to the establishment of the backhaul link connection with the IAB 300-2, has been completed. Note that step S309 may be executed before step S308 or concurrently with step S308.

In step S310, the gNB 200-1 transfers the context information on the IAB node 300-2 acquired in step S301 to the gNB 200-2 over the Xn interface.

In step S311, the gNB 200-1 transmits a notification to the 5GC 10, indicating that the backhaul link connection with the IAB node 300-2 has been established. Alternatively, the gNB 200-1 may transmit a request to establish a PDU session for the IAB node 300-2 to the 5GC 10. As described above, the PDU session establishment request may be transmitted from the AMF 11 to the gNB 200-1 before step S311 or in step S311.

Other Embodiments

In the example described in the above embodiment, the IAB node 300-1 is handed over to the gNB 200-1 due to the gNB 200-1 not having the donor capability after the IAB node 300-1 has established a radio connection with the gNB 200-1. In such an example, each gNB 200 may provide information indicating whether it has the donor capability to the IAB node 300-1. This enables the IAB node 300-1 to select the gNB 200 having the donor capability and establish the connection with such a gNB 200.

For example, the gNB 200 having the donor capability broadcasts a system information block (SIB) including information indicating that it has the donor capability. The IAB node 300-1 selects the gNB 200 to be the connection destination, based on the SIB. When the gNB 200 has the donor capability and the received power from this gNB 200 does not fall below a threshold, the IAB node 300-1 may select this gNB 200 as the connection destination. Alternatively, when the gNB 200 does not have donor capability, the IAB node 300-1 may reselect, upon receiving the SIB transmitted from the gNB 200, another gNB 200. Then, when the SIB transmitted from the other gNB 200 indicates that the other gNB 200 has the donor capability, the IAB node 300-1 performs the random access procedure for the other gNB 200 regarded as the connection destination and may transmit the IAB indication.

An example in which the mobile communication system 1 is a 5G mobile communication system is mainly described in the above embodiment. Alternatively, the base station in the mobile communication system 1 may be an eNB. Furthermore, the core network in the mobile communication system 1 may be Evolved Packet Core (EPC). Furthermore, the gNB may be connected to the EPC, the eNB may be connected to the 5GC, and the gNB and the eNB may be connected to each other via an inter-base station interface (Xn interface, X2 interface).

A program for causing a computer to execute each processing described the above embodiment. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing by the UE 100 and the gNB 200 and a processor that executes the program stored in the memory may be provided.

Note that the flows shown in each figure may be combined as appropriate.

The invention claimed is:

1. A base station comprising:
a network communicator configured to transmit a handover request message for handing over a wireless communication apparatus having a RRC connection with the base station to another base station, wherein
the handover request message includes an Integrated Access and Backhaul (IAB) indication indicating that the wireless communication apparatus is an IAB node having a user equipment function and a base station function,
the IAB node has a UE function configured to perform radio communication with an upper node and a gNB function configured to perform radio communications with a lower node,
the base station comprises a transmitter configured to broadcast a System Information Block (SIB) including information indicating that the base station supports the IAB node, and
the network communicator is configured to transmit the IAB indication to an Access and Mobility Management Function (AMF) included in a core network.

2. The base station according to claim 1, further comprising:
a receiver configured to receive the IAB indication from the wireless communication apparatus.

3. A communication control method used in a base station, the method comprising:
transmitting a handover request message for handing over a wireless communication apparatus having a RRC connection with the base station to another base station, wherein
the handover request message includes an Integrated Access and Backhaul (IAB) indication indicating that the wireless communication apparatus is an IAB node having a user equipment function and a base station function,
the IAB node has a UE function configured to perform radio communication with an upper node and a gNB function configured to perform radio communications with a lower node, and
the method further comprises
broadcasting a System Information Block (SIB) including information indicating that the base station supports the IAB node, and
transmitting the IAB indication to an Access and Mobility Management Function (AMF) included in a core network.

4. A mobile communication system including a base station and a wireless communication apparatus, wherein
the base station is configured to transmit a handover request message for handing over the wireless communication apparatus having a RRC connection with the base station to another base station, wherein
the handover request message includes an Integrated Access and Backhaul (IAB) indication indicating that the wireless communication apparatus is an IAB node having a user equipment function and a base station function,
the IAB node has a UE function configured to perform radio communication with an upper node and a gNB function configured to perform radio communications with a lower node,
the base station is configured to broadcast a System Information Block (SIB) including information indicating that the base station supports the IAB node, and the base station is configured to transmit the IAB indication to an Access and Mobility Management Function (AMF) included in a core network.

\* \* \* \* \*